United States Patent

(12) United States Patent
Giers

(10) Patent No.: US 6,201,997 B1
(45) Date of Patent: *Mar. 13, 2001

(54) MICROPROCESSOR SYSTEM FOR SAFETY-CRITICAL CONTROL SYSTEMS

(75) Inventor: Bernhard Giers, Frankfurt am Main (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/011,439

(22) PCT Filed: Jun. 20, 1996

(86) PCT No.: PCT/EP96/02688

§ 371 Date: Apr. 7, 1998

§ 102(e) Date: Apr. 7, 1998

(87) PCT Pub. No.: WO97/06487

PCT Pub. Date: Feb. 20, 1997

(30) Foreign Application Priority Data

Aug. 10, 1995 (DE) .............................. 195 29 434

(51) Int. Cl.⁷ .............................. G05B 9/02; G05B 19/18; G06F 19/00; G06F 13/38; B60B 39/00

(52) U.S. Cl. .................. 700/79; 700/2; 700/82; 700/80; 700/81; 700/111; 710/128; 701/71

(58) Field of Search .................. 700/79, 80, 81, 700/111, 2, 82; 714/10, 11, 3, 745, 736, 735, 737; 701/71; 710/128

(56) References Cited

U.S. PATENT DOCUMENTS 3,978,327 * 8/1976 Huber ........................... 714/10
4,049,957 * 9/1977 Kera et al. .................... 714/10
4,636,874 * 1/1987 Hoogendoorn et al. ........ 386/78

(List continued on next page.)

FOREIGN PATENT DOCUMENTS 3225455  1/1984 (DE) .
3234637  3/1984 (DE) .

(List continued on next page.)

OTHER PUBLICATIONS

Patent Abstracts of Japan, vol. 95, No. 006, JP 07 160521 (Jun. 23, 1995).

(List continued on next page.)

Primary Examiner—William Grant
Assistant Examiner—Iván Calcano
(74) Attorney, Agent, or Firm—Rader, Fishman & Grauer PLL

(57) ABSTRACT

A microprocessor system intended for safety-critical control systems includes two synchronously operated central units (1, 2) which receive the same input data and process the same program, in addition, read-only memories (5, 10) and random-access memories (6, 11) for useful data and test data, and comparators (18, 19) which check the output signals of the central units (1, 2) and issue disconnecting signals in the event of non-correlation. The central units (1, 2) are connected to the memories and the input and output units by way of separate bus systems (3, 4) and coupled by driver stages (15, 16, 17) which enable the central units (1, 2) to jointly read and process the data available in the two bus systems (3, 4).

A microprocessor system intended for safety-critical control systems includes two synchronously operated central units which receive the same input data and process the same program, in addition, read-only memories and random-access memories for useful data and test data, and comparators which check the output signals of the central units and issue disconnecting signals in the event of non-correlation. The central units are connected to the memories and the input and output units by way of separate bus systems and coupled by driver stages which enable the central units to jointly read and process the data available in the two bus systems.

9 Claims, 1 Drawing Sheet

U.S. PATENT DOCUMENTS

| | | | | |
|---|---|---|---|---|
| 4,961,067 | * | 10/1990 | Suzuki | 340/146.2 |
| 5,029,071 | * | 7/1991 | Kinoshita | 714/11 |
| 5,067,071 | * | 11/1991 | Schanin et al. | 710/113 |
| 5,088,027 | * | 2/1992 | Tanagawa et al. | 714/27 |
| 5,193,175 | * | 3/1993 | Cutts, Jr. et al. | 714/11 |
| 5,420,883 | * | 5/1995 | Swensen et al. | 375/200 |
| 5,551,047 | * | 8/1996 | Mori et al. | 712/28 |
| 5,625,276 | * | 4/1997 | Scott et al. | 322/24 |
| 5,734,695 | * | 3/1998 | Seesing et al. | 379/9 |
| 5,777,874 | * | 7/1998 | Flood et al. | 700/82 |
| 5,778,203 | * | 7/1998 | Birkedahl et al. | 710/126 |
| 5,786,996 | * | 7/1998 | Vitkus et al. | 700/82 |
| 5,862,502 | * | 1/1999 | Giers | 701/71 |
| 5,880,954 | * | 3/1999 | Thomson et al. | 700/79 |
| 5,933,347 | * | 8/1999 | Cook et al. | 700/82 |
| 5,993,039 | * | 11/1999 | Crill | 700/79 |
| 5,996,046 | * | 11/1999 | Yagisawa et al. | 711/112 |
| 5,997,167 | * | 12/1999 | Crater et al. | 700/79 |
| 6,004,019 | * | 12/1999 | Suita et al. | 700/212 |
| 6,038,684 | * | 3/2000 | Liddell et al. | 714/11 |
| 6,044,207 | * | 3/2000 | Pecone et al. | 710/129 |
| 6,049,855 | * | 4/2000 | Jeddeloh | 711/157 |
| 6,067,595 | * | 5/2000 | Lindenstruth | 710/129 |
| 6,073,190 | * | 6/2000 | Rooney | 710/56 |
| 6,073,194 | * | 6/2000 | Lowe | 710/100 |
| 6,125,419 | * | 9/2000 | Umemura et al. | 710/129 |

FOREIGN PATENT DOCUMENTS

| | | |
|---|---|---|
| 3024370 | 1/1987 | (DE) . |
| 3938501 | 5/1991 | (DE) . |
| 4137124 | 5/1993 | (DE) . |
| 4341082 | 6/1995 | (DE) . |
| 3533849 | 10/1995 | (DE) . |
| 0306348 | 3/1989 | (EP) . |
| 0372579 | 6/1990 | (EP) . |
| 0518630 | 12/1992 | (EP) . |

OTHER PUBLICATIONS

Nix, H.G., Sichere Mikroprozessorsystem fur Schutzaufgaben bei der ProzeBautomatisierung, Jan. 28, 1986, H.3, S.130–135.

* cited by examiner

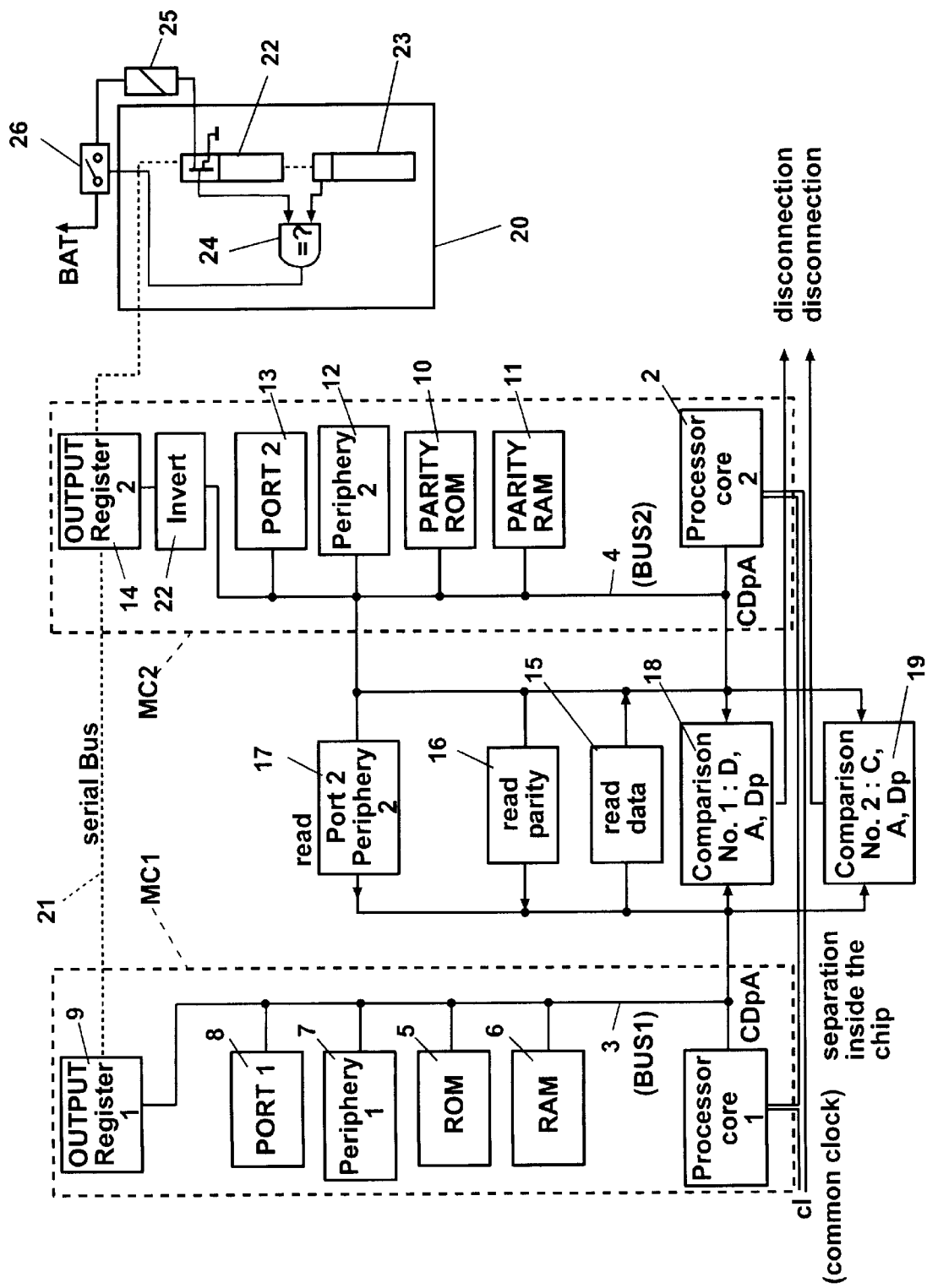

MICROPROCESSOR SYSTEM FOR SAFETY-CRITICAL CONTROL SYSTEMS

BACKGROUND OF THE INVENTION

The present invention relates to a microprocessor system for safety-critical control systems, including two synchronously operated central units or CPUs which receive the same input data and process the same program, equipped with read-only memories (ROM) and random-access memories (RAM), and memory locations for test data and test data generators, and also including comparators which check the output data of the central units and issue disconnecting signals in the event of non-correlation.

Safety-critical control systems are, for example, automotive vehicle control systems which intervene into braking operations. Among these control systems, especially wheel-lock control systems or anti-lock systems (ABS) and traction slip control systems (TCS, etc.) are very important and available on the market in many versions. Driving stability control systems (DSC, ASMS), suspension control systems, etc., are also critical in terms of safety because they are based on brake management, and their malfunction may impair the driving stability of the vehicle in other ways. Therefore, it is imperative to constantly monitor the operability of such systems in order to disconnect the control when an error occurs, or to switch the control over in a condition which jeopardizes safety less.

German patent No. 32 34 637 discloses an example of a circuit arrangement or a microprocessor system for controlling and monitoring an anti-lock vehicle brake system. In this patent, the input data are sent in parallel to two identically programmed microcomputers where they are processed synchronously. The output signals and intermediate signals of the two microcomputers are checked for correlation by redundant comparators. In the event of non-correlation of the signals, disconnection of the control is effected by a circuit which also has a redundant design. In this known circuit, one of the two microcomputers is used to produce braking pressure control signals, while the other one is used to produce the test signals. Thus, two complete microcomputers, including the associated read-only memories and random-access memories, are required in the symmetrically designed microprocessor system.

In another prior art system, based on which the circuit described in German patent application No. 41 37 124 is configured, the input data are also sent in parallel to two microcomputers, only one of which, however, performs the complete complicated signal processing operation. The second microcomputer is mainly used for monitoring, so that the input signals, after being conditioned and time derivatives being produced, etc., can be further processed by way of simplified control algorithms and a simplified control philosophy. The simplified data processing is sufficient to produce signals which permit indications of the proper operation of the system by comparison with the signals processed in the more sophisticated microcomputer. The use of a test microcomputer of a reduced capacity permits diminishing the expenditure in manufacture compared to a system having two complete, sophisticated microcomputers of identical capacity.

German patent application No. 43 41 082 also discloses a microprocessor system of the previously mentioned type. However, the system is especially intended for use in the control system of an anti-lock brake system. The prior art microprocessor system, which can be mounted on one single chip, includes two central units, or CPUs, in which the input data are processed in parallel. The read-only memories and the random-access memories, to which both central units are connected, comprise additional memory locations for test data, each having a generator to produce test data. The output signals of one of the two central units are further processed for producing the control signals, and the other central unit, i.e. the 'passive' one, is only used to monitor the 'active' central unit. The expenditure in manufacture is considerably reduced, without deteriorating the error detection ability, by eliminating the need for a double provision of the memories in this system and by accepting a relatively small extension of the memories to store the test data.

Also, an object of the present invention is to develop a microprocessor system which detects and signals malfunctions of the system with the extremely high degree of probability and reliability which is required for safety-critical applications. Additionally, a comparatively low expenditure in manufacture should be sufficient for a microprocessor system of this type.

SUMMARY OF THE INVENTION

It has been found that this object can be achieved by a system in which the central units, or CPUs, are connected to the read-only memories and the random-access memories and to input and output units by way of separate bus systems, and that the bus systems are connected or coupled one to the other by driver stages which enable both central units to jointly read and process the data, including the test data and commands, present or available in the two bus systems. The input and output data of the two central units, including the test data and commands, present on the two bus systems, are checked for correlation by the comparator(s) of the system of the present invention.

The microprocessor system of the present invention is based on the use of two equal, fully redundantly operated processor cores or central units which together process redundantly the data supplied by way of two separate bus systems. Subsequently, the input and output signals of both central units are compared for correlation by way of a simple hardware comparator to which a second comparator is connected in parallel for reasons of safety. The memories of the system of the present invention are provided only one time. There are only provided additional memory locations for test data existing in the form of parity bits, for example.

In a preferred aspect of the present invention, a complete microprocessor comprising a central unit, read-only and random-access memories, input and output stage, is connected to one of the two bus systems. The second bus system, instead of the read-only and random-access memories, is directly connected only to corresponding memory locations for test data. The driver stages coupling the two bus systems, however, enable both central units to read all necessary data furnished by the useful data memories, the test data memories and the input stages. The microprocessor system of the present invention is thereby given a particularly straightforward structure which favors accommodating all components on one single chip.

Further features, advantages and possible applications can be seen in the following description of an embodiment making reference to the accompanying drawing.

BRIEF DESCRIPTION OF THE DRAWING

The only drawing, in a schematically simplified view, illustrates the most important components of a microprocessor system of the present invention.

DETAILED DESCRIPTION OF THE DRAWING

The attached drawing serves to explain the principal design and operation of a microprocessor system of the present invention. A single-chip microcomputer system is shown in this example which includes two synchronously operated central units 1, 2 which are also termed as computer or processor cores, or as CPUs, and separate bus systems 3, 4 (bus 1, bus 2). The common clock for both central units 1, 2 is supplied through the connection cl (common clock). The central unit 1 is supplemented to a complete microcomputer MC1 by a read-only memory 5 (ROM), a random-access memory 6 (RAM), input stages 7, 8 (periphery 1, port 1), and by an output stage 9. In contrast thereto, only test data memories 10, 11 and input stages 12, 13 and one output stage 14 are connected to the second bus system 4 (bus 2) beside the central unit 2. The test data memory locations for the data in the read-only memory 5 are incorporated in the memory 10, and the test data for the random-access memory 6 are incorporated in the memory 11. These elements are comprised in a 'lean' microcomputer MC2.

Further, what is essential to the present invention, the two bus systems 3, 4 (bus 1, bus 2) are coupled by driver stages 15, 16, 17 which permit joint reading of the incoming data by the two central units 1, 2. The stages 15 to 17 are drivers (or 'buffers' with an enable function). The directions of transmission of the drivers 15 to 17 are represented by an arrow. The driver 15 is used to transmit the data which are disposed on the bus system 3 (bus 1) to the central unit 2. The driver 16 is used to transmit the test data from the test data memories 10, 11 to the central unit 1, and the driver 17 is used to transmit the data from the input stages 12, 13 of the second bus system 4 (bus 2) to the central unit 1.

Each bus system 3, 4 comprises a control bus 'C', a data bus 'D' and an address bus 'A'. The data bus also includes the test data 'p'. The input and output data of the central units which are checked for correlation in a hardware comparator 18 and an equal comparator 19 which is arranged on the same chip as the comparator 18, spatially separated from it, are referred to as 'CdpA'.

In contrast to known systems, the microprocessor system of the present invention does not permit making a distinction between an active and a passive processor. The two processor cores or central units 1, 2 are equally entitled rather. They process fully redundantly the jointly read data which also comprise the test or redundancy data and the control commands. The input and output signals of the processors 1, 2 are checked for correlation and sent to a represented valve actuation control 20 by way of the associated bus systems 3, 4 and the output units 9, 14. The operation of the valve actuation control is as follows:

Both central units 1, 2 supply identical output signals to the output units 9, 14 via the bus systems 3, 4. An inverter 22 is interposed in the conduit to one of the two output units, i.e. in the conduit to the output unit 14 in this case. The valve actuation control 20 is connected by way of a serial bus 21. Two output shift registers 22, 23 are provided in this embodiment. The data are sent to the second shift register 22 in an inverted fashion in order to prevent short circuits among the processors. The data stored in the shift registers 22, 23 are checked for correlation by way of an AND-gate 24 with an inverting input. If the AND-condition which monitors the gate 24 is not satisfied, a switch 26 in the power supply for the actuated valves or actuators 25 will be opened. This causes disconnection of the actuator actuation because an error is present.

The shift registers 22, 23 are component parts of the output stages 9, 14. Thus, the correlation of the output signals is monitored once more, in this case externally, irrespective of the comparators 18, 19. In a case of malfunction, this causes interruption of the actuation of the valves 25 irrespective of the operation of the central units 1, 2.

According to the present invention, the central unit (which also comprises the entire arithmetic unit and the sequence control) is provided twice to protect the calculating results and the correct processing of the programs. The data bus is extended by a generator for the test data or for redundancy information, for parity bits, for example. The output signals of the two central units are conducted to the hardware comparators (18, 19) for a checking operation. The comparators check the identity of the signals, including the test signals, and cause a system DISCONNECTION when the synchronous processing of the programs by the redundant central units have different results.

The output signals of both central units are equally entitled, i.e., an actuation of memory units (RAM, ROM) or the 'periphery' can be effected by one of the two central units.

In an automotive vehicle control system, the wheel sensors, for example, whose output signals are the most important input quantities of the control system, can be connected by way of the input units 7, 12 which are referred to as periphery 1 and periphery 2 in the drawing. It is possible to distribute the sensor signals delivered (as shown) on the two bus systems 3, 4. The signal delivery may also be designed redundantly, i.e., by connecting all sensor signals to both bus systems 3, 4.

The same applies to the data introduced by way of the input stages 8, 13 (port 1, port 2). The brake light switch and other sensors, for example, are connected by way of these input stages in a controlled brake system.

An important feature of the present invention is that—in spite of the comprehensive redundancy and 'protection' of the data processing operation—the expenditure in memories is relatively small. As has been explained hereinabove, the read-only and random-access memories are provided for only one of the two microcomputers (MC1). The second microcomputer (MC2) incorporates only memory locations (10, 11) for test data. The driver stages 15, 16, 17 coupling both bus systems ensure that the stored useful data and test data are available to both central units in the data-processing operation.

Different from the embodiment shown, the memory locations of the memories 5, 6, 10, 11 can be distributed completely differently on the two bus systems 3, 4 or microcomputers MC1, MC2. The memory location required in total is not increased thereby.

The test data or parity bits are taken into account for the identification of errors when reading and writing the data stored and requiring being stored. With respect to each memory cell of the read-only memory and the random-access memory, the redundancy information is stored under the same address in the memories 10, 11 of the second microprocessor MC2 which has only memory locations for the test data. The test or redundancy information for the read-only memory has already been defined during programming. The test or redundancy information in the random-access memories is generated during the writing operation. Similar to the reading operation of the data and commands, the test or redundancy information is transmitted by way of the driver stage 16 which couples the two bus systems 3, 4. In the writing access, the data to be written are extended by a redundancy information stored along with the data. In a reading access, the data and the redundancy information read back are checked for correctness by the comparators 18, 19.

Where the objective is to record and process the input data redundantly for safety reasons, the input stages (7, 8, 12, 13) have a double design. These stages may be arranged partly in the address space of the one central unit and that of the other central unit. Therefore, the periphery elements are uncoupled exactly as in a symmetric microprocessor system.

The output signals, in particular the actuating signals for the valve actuation control 20, which comprise doubly designed output stages can also be partly arranged in the address space of the one central unit or that of the other central unit. Consequently, output periphery elements are uncoupled as in a fully symmetric concept.

To identify errors in the transmission of data by way of the bus system, the bus system is provided redundantly in the form of the bus systems 3 and 4 (bus 1, bus 4). The signals issued by the two central units 1, 2 and applied to the bus systems are checked for correlation by the comparators 18, 19.

When parity generators are used to produce the test data or redundancy data, two generators are required in the system of the present invention, which can be accommodated in the central units 1, 2 or in the comparators 18, 19, for example. In a writing access to the additional memory locations which are available for the random-access memory (memory 11), the data generated in the central unit 2 by the redundancy generator is memorized. In a reading access to the additional memory locations for the test data in the read-only memory or random-access memory, the information generated by the redundancy generator is compared with the read redundancy information for correlation.

Appropriate redundancy generators may be realized, for example, in a known manner by way of exclusive OR-gates.

What is claimed is:

1. A microprocessor system for safety-critical control systems comprising:

two synchronously operated central units which receive identical input data and process identical programs, read-only memory and random-access memory for storing test data, test data generators, comparators that compare output data or output signals of the central units and issue disconnecting signals in the event of non-correlation, wherein the central units each are connected to the read-only memory and the random-access memory and to input and output units by way of a separate bus system, and wherein said separate bus systems are connected to one another by driver stages which enable both central units to jointly read and process the data, including test data and commands, transmitted in the two bus systems.

2. The microprocessor system as claimed in claim 1, wherein the comparators check input and output data of the two central units, including the test data and commands, available in the two bus systems, for correlation.

3. The microprocessor system as claimed in claim 1, wherein the read-only memory and the random-access memory are distributed on memory connected to the two bus systems.

4. The microprocessor system as claimed in claim 3, wherein the read-only memory and the random-access memory are connected to one bus system, and the associated test data memory is connected to the other bus system.

5. The microprocessor system as claimed in claim 1, wherein at least the two central units, the read-only and random access memory, and wherein the driver stages, and said comparators are arranged on one single chip.

6. The microprocessor system as claimed in claim 1, wherein each of the two bus systems comprises a data and test information bus, an address bus and a control bus.

7. The microprocessor system as claimed in claim 1, wherein the signals or data of the two central units in the two bus systems, are sent to two parallel connected hardware comparators which are arranged within one chip, spatially separated from each other.

8. The microprocessor system as claimed in claim 1, further including an external comparator for connecting actuators or valves to the system.

9. The microprocessor system as claimed in 8, wherein the external comparator has output shift registers, of which one register receives output data in an inverted manner, wherein data stored in the two shift registers are compared by way of an AND-gate which has an inverted input and generates an output signal which keeps a switch closed in a power supply supplying the actuators or valves.

* * * * *